US009669658B1

(12) United States Patent
Tong (10) Patent No.: US 9,669,658 B1
(45) Date of Patent: Jun. 6, 2017

(54) HOLLOW TWIN-WHEEL CASTER STRUCTURE OF LUGGAGE

(71) Applicant: Joy Tong, Boca Raton, FL (US)

(72) Inventor: Joy Tong, Boca Raton, FL (US)

( * ) Notice: Subject to any disclaimer, the term of this patent is extended or adjusted under 35 U.S.C. 154(b) by 0 days.

(21) Appl. No.: 14/993,466

(22) Filed: Jan. 12, 2016

(51) Int. Cl.
*B60B 33/00* (2006.01)

(52) U.S. Cl.
CPC ...... *B60B 33/0049* (2013.01); *B60B 33/0002* (2013.01); *B60B 33/0042* (2013.01); *B60B 2200/45* (2013.01); *B60B 2380/12* (2013.01); *B60B 2900/111* (2013.01); *B60B 2900/711* (2013.01); *Y10T 16/1853* (2015.01)

(58) Field of Classification Search
CPC ............ B60B 33/0049; B60B 33/0042; B60B 33/0002; B60B 33/0028; B60B 2900/711; B60B 2900/111; B60B 2380/12; B60B 2200/45; Y10T 16/18; Y10T 16/1853; Y10T 16/184; Y10T 16/1847
USPC ............................... 16/45–47, 18 R; 190/18 A
See application file for complete search history.

(56) References Cited

U.S. PATENT DOCUMENTS

| 4,173,810 A * | 11/1979 | James | B60B 33/0028 16/47 |
|---|---|---|---|
| 4,351,084 A | 9/1982 | Fontana | |
| 4,377,883 A | 3/1983 | Folson | |
| 4,706,329 A | 11/1987 | Screen | |
| 5,119,525 A * | 6/1992 | Melara | B60B 33/0028 16/18 R |
| 6,478,623 B1 | 11/2002 | Wu | |
| 6,748,623 B1 * | 6/2004 | Tsai | B60B 7/02 16/35 D |
| 6,839,939 B2 | 1/2005 | Donakowski | |
| 7,150,070 B2 | 12/2006 | Donakowski | |
| 7,647,673 B2 | 1/2010 | Melara | |
| 7,725,986 B2 | 6/2010 | Tsai | |
| 8,312,595 B2 | 11/2012 | Trivini | |
| 8,375,515 B2 | 2/2013 | Hozumi et al. | |

* cited by examiner

*Primary Examiner* — William Miller
(74) *Attorney, Agent, or Firm* — Pai Patent & Trademark Law Firm; Chao-Chang David Pai (57) ABSTRACT

A hollow twin-wheel caster structure of a luggage includes a wheel seat for coupling to the bottom of the luggage, the wheel seat having a horizontal inner annular hole; a hollow shaft unit inserted in the inner annular hole, two ends of the hollow shaft unit extending out of two sides of the inner annular hole to form a pair of coupling portions, the center of the hollow shaft unit being formed with a hollow portion communicating with the two ends of the hollow shaft unit; two plastic wheels fitted on the coupling portions; at least one bearing fitted on the hollow shaft unit; and a support member plugged into the hollow portion of the hollow shaft unit, the support member leaning against an inner wall of the hollow portion to prevent the hollow shaft unit from being compressed and deformed.

9 Claims, 8 Drawing Sheets

HOLLOW TWIN-WHEEL CASTER STRUCTURE OF LUGGAGE

BACKGROUND OF THE INVENTION (a) Field of the Invention

The present invention relates to a luggage caster, and more particularly to a hollow twin-wheel caster structure applied to the bottom of a luggage.

(b) Description of the Prior Art

A conventional caster installed to the bottom of a luggage is a luggage accessory for the user to pull the luggage conveniently. As disclosed in U.S. Pat. No. 5,163,539 and U.S. Pat. No. 1,153,838, the caster is a single-wheel structure. A twin-wheel caster is available on the market, such as disclosed in U.S. Pat. No. 4,706,329, U.S. Pat. No. 4,351,084, U.S. Pat. No. 4,377,883 and U.S. Pat. No. 6,478,623. Compared to the single-wheel structure, the twin-wheel caster provides better loading capability and stability. The twin-wheel caster as taught in the aforesaid patents comprises a wheel seat coupled to the bottom of the luggage, a horizontal shaft passing through the wheel seat, two ball bearings fitted on two ends of the horizontal shaft, and two wheels fitted on the ball bearings. The diameter of the horizontal shaft is small, so the diameter of the ball bearing is also small. Therefore, the number of the balls in the ball bearings is small, which lowers the loading capability of the balls. The caster of the luggage can be damaged easily.

Figure 1:
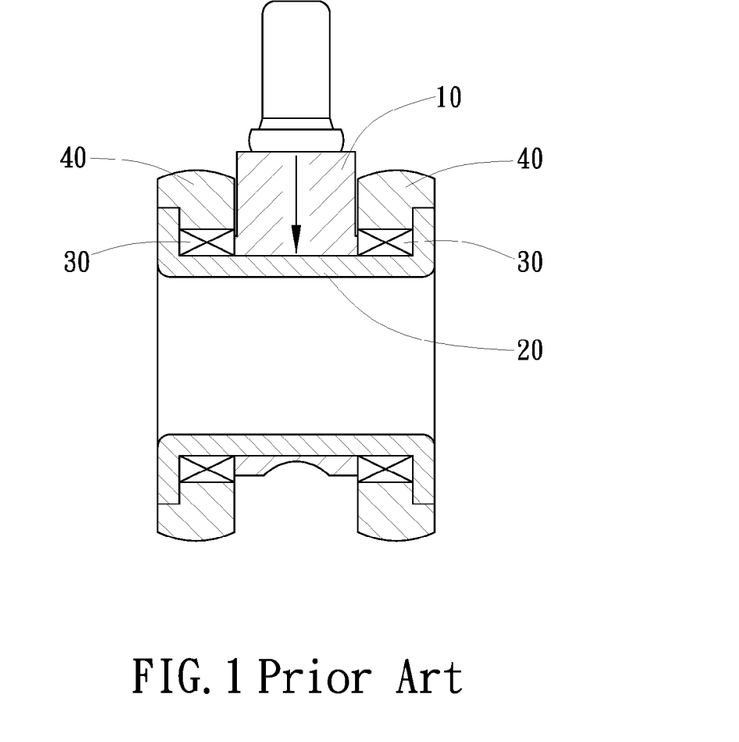
FIG. 1 is a sectional view of a conventional hollow twin-wheel caster structure of a luggage.
Figure 2:
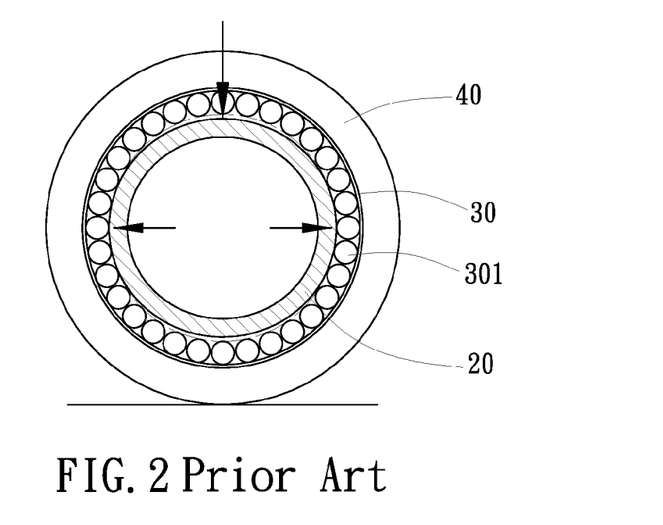
FIG. 2 is a schematic view showing the deformed hollow shaft of the conventional hollow twin-wheel caster structure.

In order to improve the aforesaid twin-wheel caster and provide a pleasing appearance, the diameter of the hollow shaft is increased to support the ball bearings and the balls, so that the diameter of the ball bearing is increased and there are relatively more balls in the ball bearings, as disclosed in U.S. Pat. No. 7,150,070, U.S. Pat. No. 6,839,939, U.S. Pat. No. 7,647,673, U.S. Pat. No. 7,725,986, U.S. Pat. No. 8,312,595, U.S. Pat. No. 8,375,515. The hollow shaft having a larger diameter is made of a plastic material by injection. The hollow shaft can be manufactured quickly to lower the cost and is light in weight. However, its structural strength is weak. Referring to FIG. 1, when the luggage is overloaded, the weight is applied to the hollow shaft 20 from the center of the wheel seat 10 to cause a slight deformation of the hollow shaft 20 (as shown in FIG. 2). When the hollow shaft 20 is deformed to become an oval-like shape, it will press the rolling route of the balls 301 of the ball bearing 30, such that the roller 40 is unable to roll smoothly. Accordingly, the inventor of the present invention has devoted himself based on his many years of practical experiences to solve these problems.

SUMMARY OF THE INVENTION

The primary object of the present invention is to provide a hollow twin-wheel caster structure of a luggage, enhancing the structural strength of the caster for the caster to be rolled smoothly.

In order to achieve the object, the hollow twin-wheel caster structure of the present invention is installed to the bottom of a luggage. The hollow twin-wheel caster structure comprises a wheel seat, a hollow shaft unit, two plastic wheels, at least one bearing, and a support member. The wheel seat is coupled to the bottom of the luggage. The hollow shaft unit is horizontally connected to or integrally formed with the wheel seat. Two ends of the hollow shaft unit extend out of the wheel seat to form a pair of coupling portions. The center of the hollow shaft unit is formed with a hollow portion communicating with the two ends of the hollow shaft unit. The two plastic wheels are fitted on the coupling portions at the two ends of the hollow shaft unit. The bearing is fitted on the hollow shaft unit. The support member is plugged into the hollow portion of the hollow shaft unit. The support member leans against an inner wall of the hollow portion. The support member is adapted to prevent the hollow shaft unit from being compressed and deformed.

The hollow twin-wheel caster structure of the present invention provides the large-diameter hollow shaft unit, more bearings, and the support member plugged into the hollow portion of the hollow shaft unit, enabling the hollow shaft unit to have better structural strength. When the luggage is overloaded, the roundness of the hollow shaft unit can be kept, enabling the ball bearing to keep a smooth rolling. Furthermore, the support member can be one of a circular ball, an oval ball and a cylinder. The support member is plugged in the hollow portion of the hollow shaft unit.

DETAILED DESCRIPTION OF THE PREFERRED EMBODIMENTS

Embodiments of the present invention will now be described, by way of examples only, with reference to the accompanying drawings.

Figure 3:
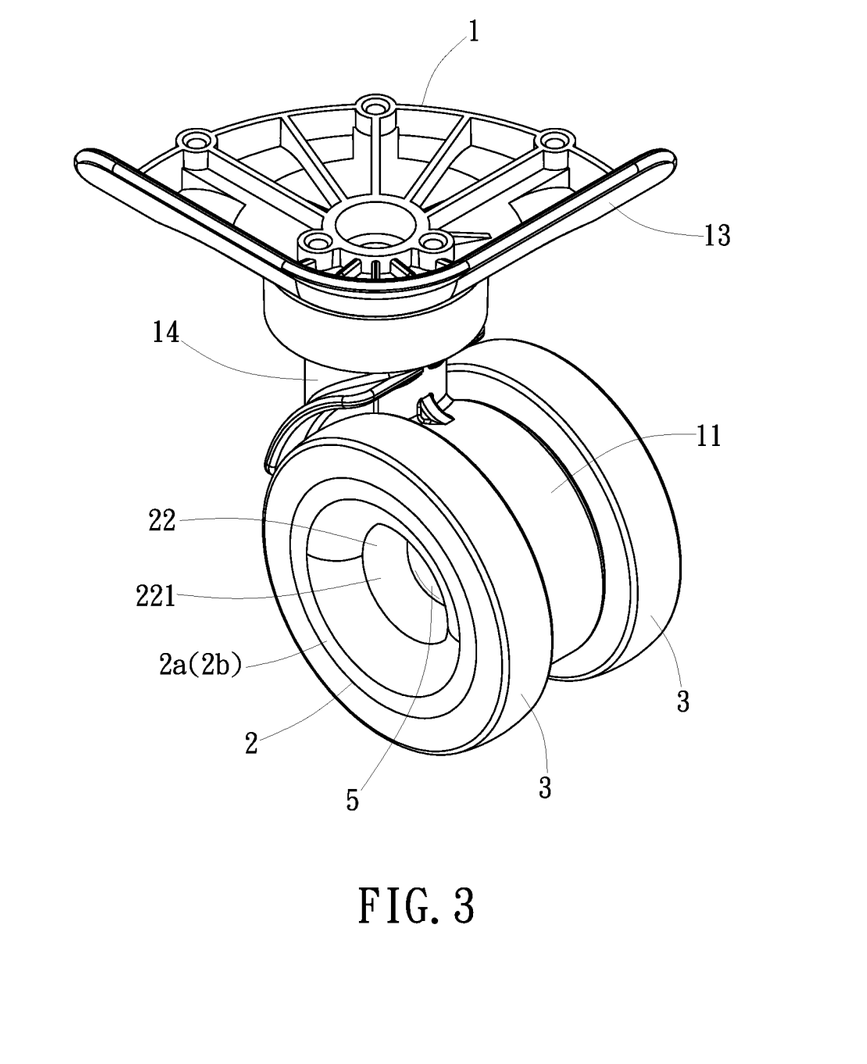
FIG. 3 is a perspective view of a first embodiment of the hollow two-wheel caster structure of the present invention.
Figure 4:
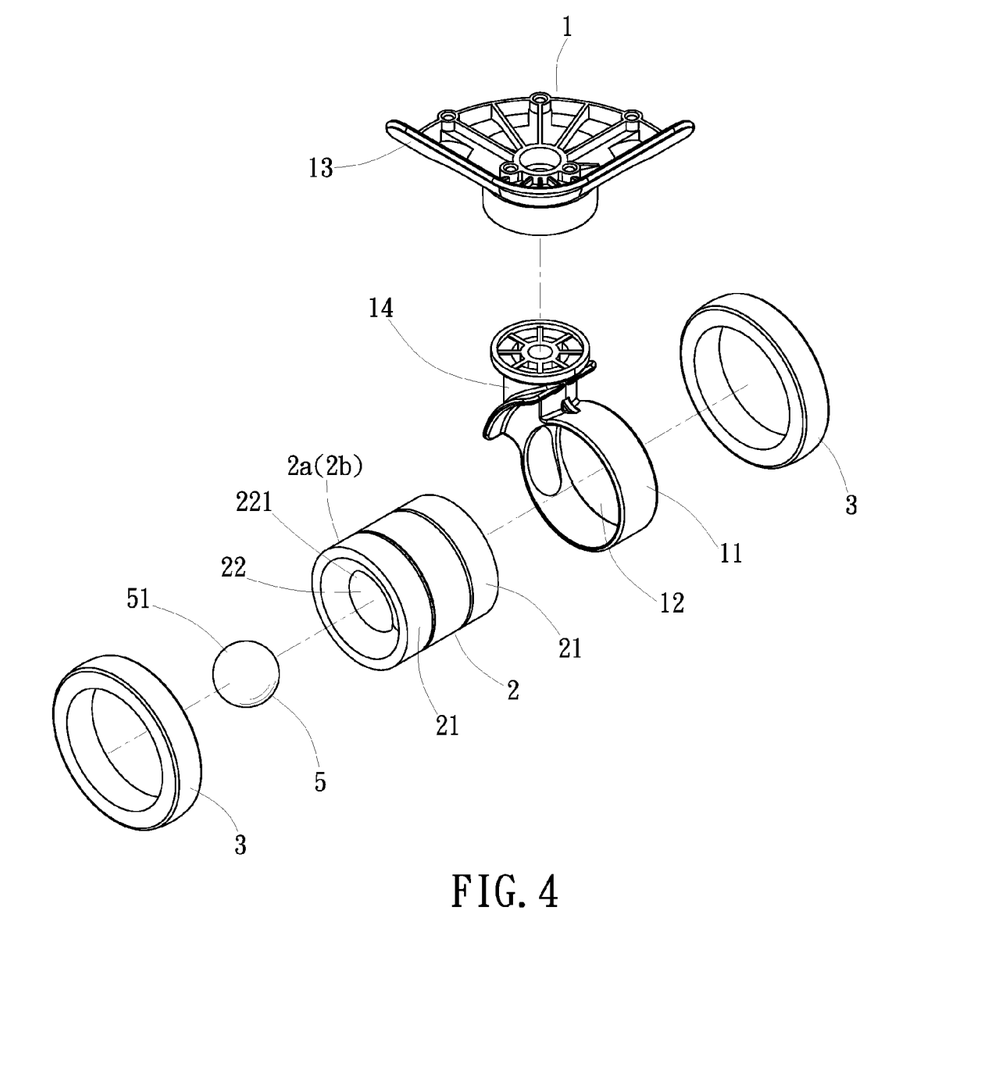
FIG. 4 is an exploded view of the first embodiment of the hollow two-wheel caster structure of the present invention.
Figure 5:
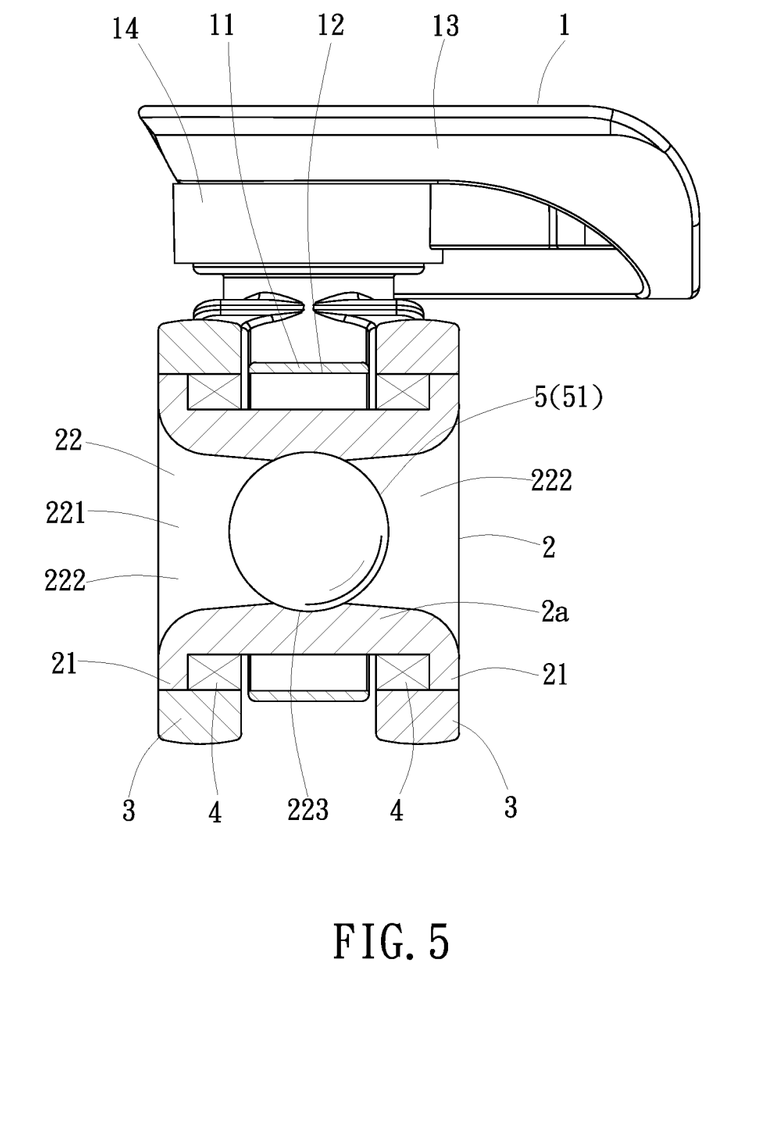
FIG. 5 is a sectional view of the first embodiment of the hollow two-wheel caster structure of the present invention.

As shown in FIG. 3, FIG. 4, and FIG. 5, the present invention discloses a hollow twin-wheel caster structure which is a movement component installed to the bottom of a luggage or other mobile articles. A preferred embodiment of the present invention comprises a wheel seat 1, a hollow shaft unit 2, two plastic wheels 3, at least one bearing 4, and a support member 5. The wheel seat 1 is coupled to the bottom of the luggage. The hollow shaft unit 2 is horizontally connected to the wheel seat 1 or integrally formed with the wheel seat 1. The hollow shaft unit 2 is a circular sleeve. Two ends of the hollow shaft unit 2 extend out of the wheel seat 1 to form a pair of circular coupling portions 21. The center of the hollow shaft unit 2 is formed with a hollow portion 22 communicating with the two ends of the hollow shaft unit 2. The hollow portion 22 is a through hole 221 in a circle or polygon shape. The plastic wheels 3 are fitted on the coupling portions 21 at the two ends of the hollow shaft unit 2. The plastic wheels 3 are turned along with the hollow shaft unit 2, or the plastic wheels 3 can be turned at the coupling portions 21. The bearing 4 is fitted on the hollow shaft unit 2, such that the bearing 4 is disposed between the hollow shaft unit 2 and the wheel seat 1 or between the hollow shaft unit 2 and the plastic wheels 3. The support member 5 is plugged into the hollow portion 22 of the hollow shaft unit 2. Preferably, the support member 5 is plugged into the center of the hollow portion 22 of the hollow shaft unit 2, not filling up the whole hollow portion 22, such that two ends of the hollow portion 22 is formed with a pair of spaces 222. The support member 5 leans against an inner wall 223 of the hollow portion 22, preventing the hollow shaft unit 2 from being compressed and deformed. Thereby, the hollow twin-wheel caster structure of the present invention is assembled.

As shown in FIG. 5, the hollow shaft unit 2 is a hollow shaft sleeve 2a horizontally inserted through or integrally formed with the wheel seat 1. The center of the hollow shaft sleeve 2a is formed with the hollow portion 22 (the through hole 221). Two ends of the hollow shaft sleeve 2a are formed with the coupling portions 21. The plastic wheels 3 are fitted on the coupling portions 21. The support member 5 is plugged into the center of the hollow portion 22. Preferably, the present invention comprises two bearings 4 disposed between the coupling portions 21 of the hollow shaft sleeve 2a and the plastic wheels 3, respectively, enabling the plastic wheels 3 to be turned at the coupling portions 21. Alternatively, the bearings 4 are disposed between the hollow shaft sleeve 2a and the wheel seat 1 (referring to FIG. 6), enabling the plastic wheels 3 to be turned along with the hollow shaft sleeve 2a.

Figure 6:
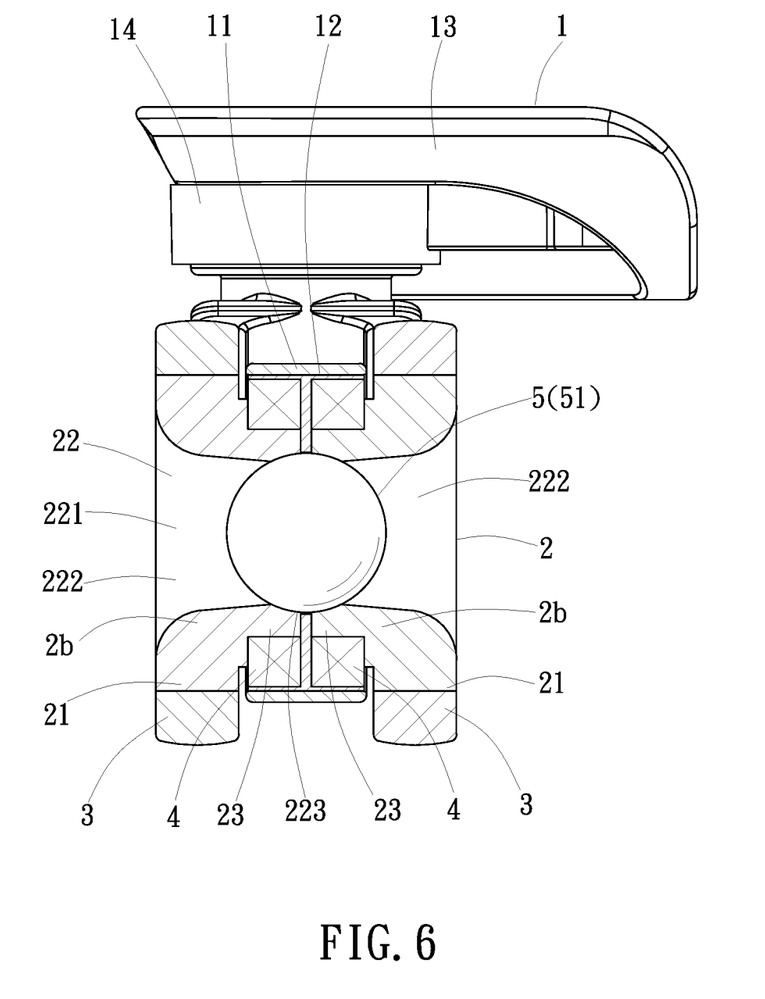
FIG. 6 is a sectional view of a second embodiment of the hollow two-wheel caster structure of the present invention.

As shown in FIG. 6, the hollow shaft unit 2 comprises two hollow shaft sleeves 2b which are horizontally inserted from two sides of the wheel seat 1 to be coupled to the wheel seat 1. Each hollow shaft sleeve 2b includes an insertion portion 23 inserted in the wheel seat 1, the coupling portion 21 connected to one end of the insertion portion 23, and the hollow portion 22 (the through hole 221) penetrating the hollow shaft sleeve 2b. The plastic wheels 3 are fitted on the coupling portions 21. The support member 5 is plugged into the hollow portion 22 between the joint ends of the two hollow shaft sleeves 2b. (It is also at the center of the hollow shaft unit 2.) Preferably, the present invention further comprises one or two bearings 4 disposed between the insertion portions 23 of the hollow shaft sleeves 2b and the wheel seat 1 respectively, enabling the plastic wheels 3 to be turned along with the hollow shaft sleeves 2b.

Figure 7:
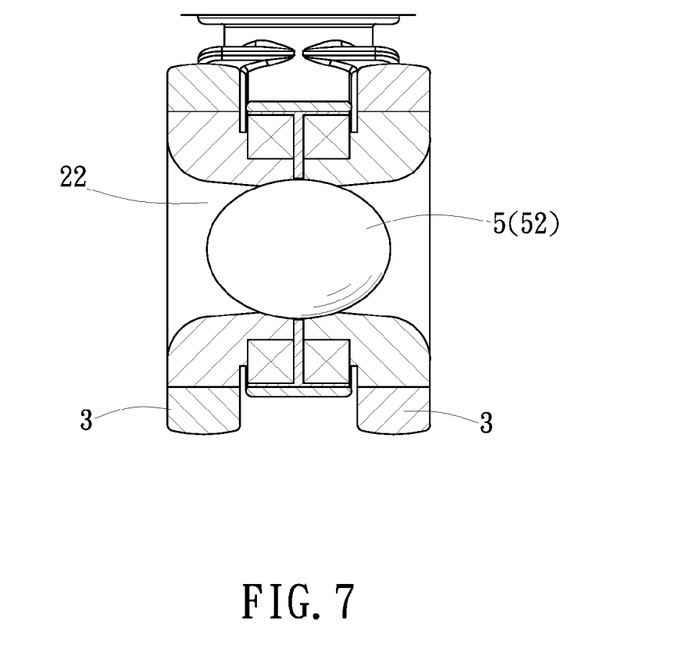
FIG. 7 is a sectional view of the present invention, showing that the support member is an oval ball.
Figure 8:
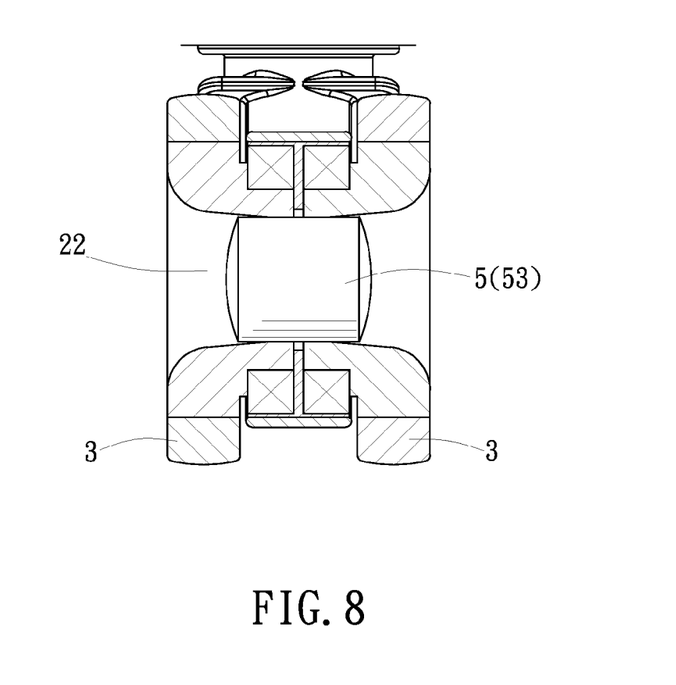
FIG. 8 is a sectional view of the present invention, showing that the support member is a cylinder.
Figure 9:
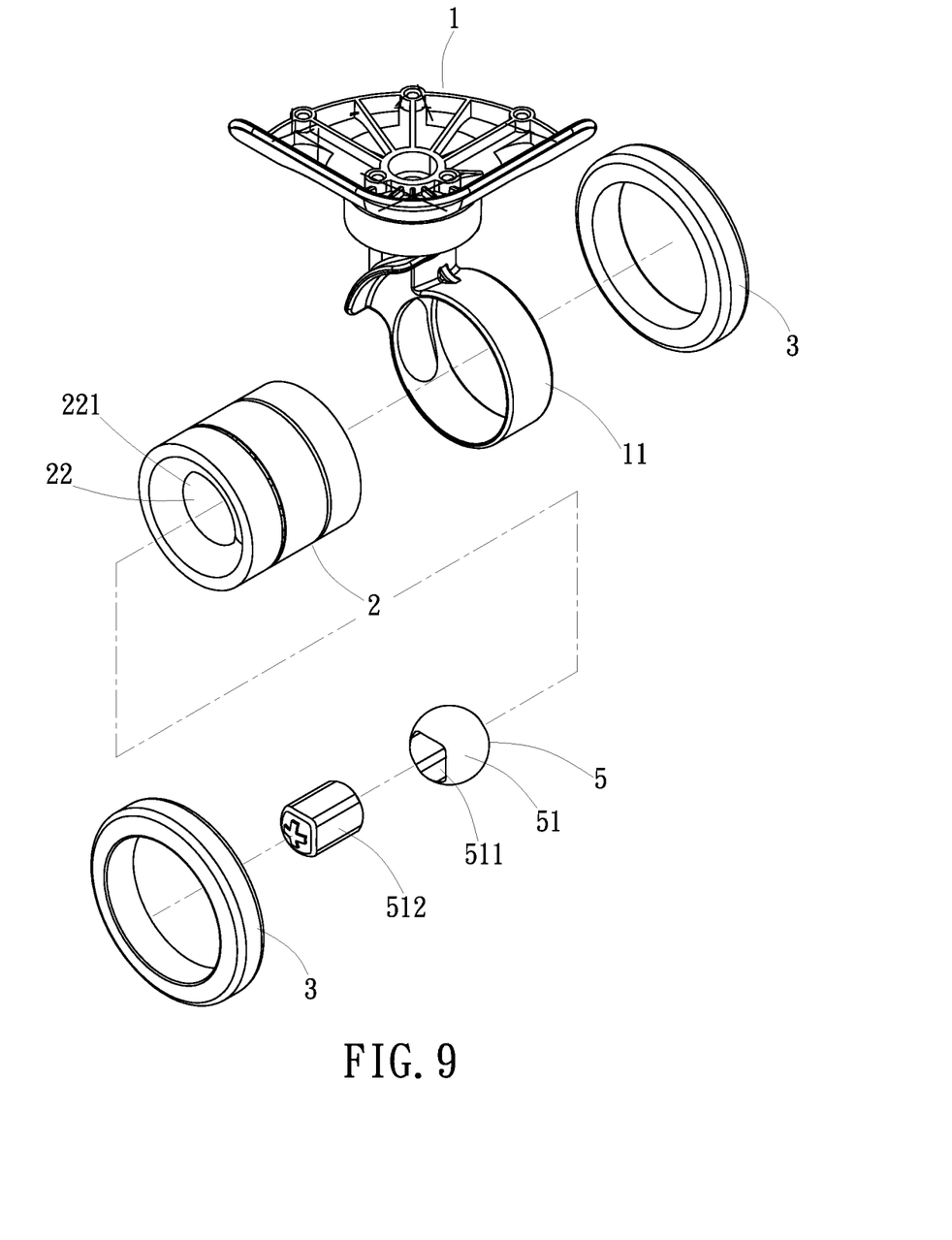
FIG. 9 is an exploded view of the present invention, showing that the support member is a circular ball with a polygonal member inserted through a polygonal hole thereof.
Figure 10:
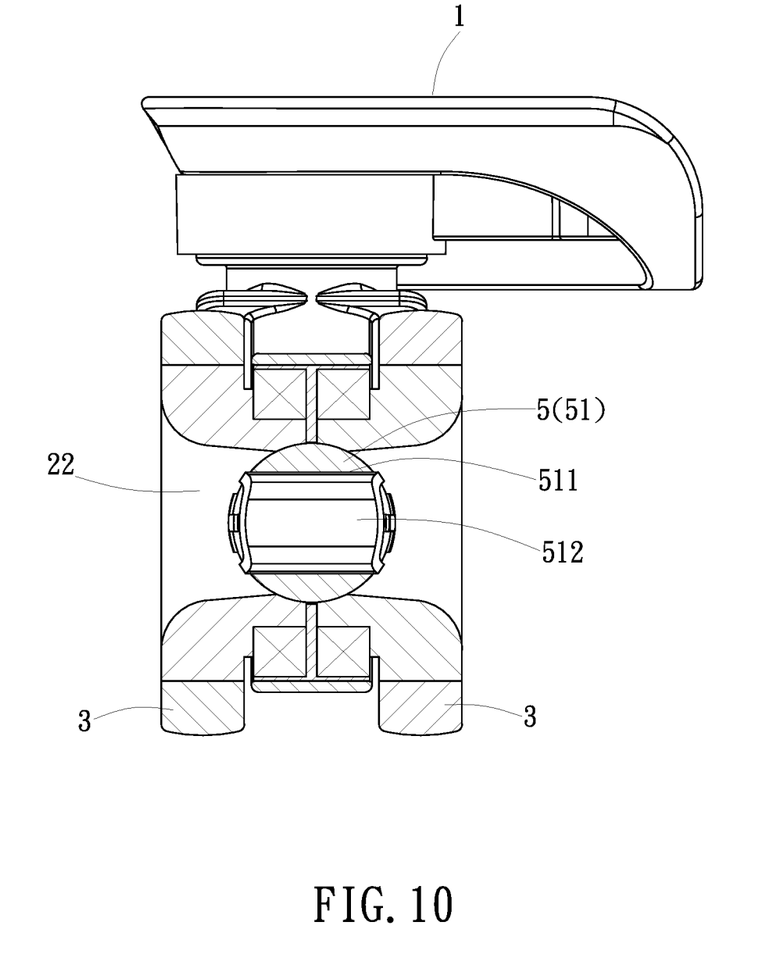
FIG. 10 is a sectional view of the embodiment of the present invention, as shown in FIG. 9.

As shown in FIG. 4, the hollow portion 22 of the hollow shaft unit 2 can be a circular hole. The support member 5 is a circular ball 51 to mate with the circular hole. The support member 5 can be an oval ball 52 (as shown in FIG. 7), a cylinder 53 (as shown in FIG. 8), or the like. For example, the hollow portion 22 is a polygonal hole, and the support member 5 is a polygonal member to mate with the polygonal hole. As shown in FIG. 9 and FIG. 10, the support member 5 is a circular ball 51. The circular ball 51 is formed with a polygonal hole 511. A polygonal member 512 is plugged into the polygonal hole 511, and two ends of the polygonal member 512 extend out of the polygonal hole 511. The polygonal member 512 may be marked with a pattern or a trademark.

As shown in FIG. 4, FIG. 5, and FIG. 6, in a preferred embodiment, the wheel seat 1 comprises an annular member 11. The annular member 11 is horizontally formed with an inner annular hole 12. Thus, the hollow shaft sleeve 2a, 2b of the hollow shaft unit 2 is inserted through the inner annular hole 12. The hollow shaft sleeve 2a, 2b extends out of two sides of the annular member 11 to form the coupling portions 21. Preferably, the wheel seat 1 comprises a retaining seat 13 coupled to the bottom of the luggage and a turning member 14 rotatably coupled to the retaining seat 13. The turning member 14 is integrally formed with the annular member 11 and the inner annular hole 12. The hollow twin-wheel caster structure of the present invention can be turned through the turning member 14.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hollow twin-wheel caster structure of a luggage, for installing to a bottom of the luggage, the caster structure comprising a wheel seat for coupling to the bottom of the luggage; a hollow shaft unit horizontally connected to or integrally formed with the wheel seat, two ends of the hollow shaft unit extending out of the wheel seat to form a pair of coupling portions, a center of the hollow shaft unit being formed with a hollow portion communicating with the two ends of the hollow shaft unit; two plastic wheels fitted on the coupling portions at the two ends of the hollow shaft unit; at least one bearing fitted on the hollow shaft unit; and a support member plugged into a center of the hollow portion of the hollow shaft unit, not filling up the whole hollow portion such that two ends of the hollow portion are respectively formed with two spaces, the support member leaning against an inner wall of the hollow portion and preventing the hollow shaft unit from being compressed and deformed.

2. The hollow twin-wheel caster structure of a luggage as claimed in claim 1, wherein the hollow shaft unit is a hollow shaft sleeve horizontally inserted through or integrally formed with the wheel seat, and a center of the hollow shaft sleeve is formed with the hollow portion.

3. The hollow twin-wheel caster structure of a luggage as claimed in claim 2, wherein the at least one bearing comprises two bearings disposed between the coupling portions of the hollow shaft sleeve and the plastic wheels, respectively.

4. The hollow twin-wheel caster structure of a luggage as claimed in claim 1, wherein the hollow shaft unit comprises two hollow shaft sleeves inserted from two sides of the wheel seat to be coupled to the wheel seat, and each hollow shaft sleeve includes an insertion portion inserted in the wheel seat, the coupling portion connected to the insertion portion, and the hollow portion penetrating the hollow shaft sleeves.

5. The hollow twin-wheel caster structure of a luggage as claimed in claim 4, wherein the at least one bearing comprises two bearings disposed between the insertion portions of the hollow shaft sleeves and the wheel seat, respectively.

6. The hollow twin-wheel caster structure of a luggage as claimed in claim 1, wherein the hollow portion is a circular hole, and the support member is one of a circular ball, an oval ball and a cylinder to mate with the circular hole.

7. The hollow twin-wheel caster structure of a luggage as claimed in claim 1, wherein the hollow portion is a polygonal hole, and the support member is a polygonal member to mate with the polygonal hole.

8. The hollow twin-wheel caster structure of a luggage as claimed in claim 1, wherein the wheel seat comprises an annular member, the annular member is horizontally formed with an inner annular hole, the hollow shaft unit is inserted through the inner annular hole, and the two ends of the hollow shaft unit extend out of two sides of the annular member to form the coupling portions.

9. The hollow twin-wheel caster structure of a luggage as claimed in claim 8, wherein the wheel seat comprises a retaining seat for coupling to the bottom of the luggage and a turning member rotatably coupled to the retaining seat, and the turning member is integrally formed with the annular member.

* * * * *